(12) United States Patent
Casati et al.

(10) Patent No.: US 7,437,675 B2
(45) Date of Patent: Oct. 14, 2008

(54) SYSTEM AND METHOD FOR MONITORING EVENT BASED SYSTEMS

(75) Inventors: Fabio Casati, Palo Alto, CA (US);
Ming-Chien Shan, Saratoga, CA (US);
Rama Chandra Murthy, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 10/358,042

(22) Filed: Feb. 3, 2003

(65) Prior Publication Data

US 2004/0153329 A1    Aug. 5, 2004

(51) Int. Cl.
*G06F 15/177* (2006.01)
*G06F 3/00* (2006.01)

(52) U.S. Cl. .................. 715/736; 715/746; 719/318; 705/1; 709/223; 709/224

(58) Field of Classification Search ......... 715/762–765, 715/736, 866, 700, 704, 200, 201, 746; 705/1, 705/51; 719/318, 330; 709/224; 707/100, 707/104.1
See application file for complete search history.

(56) References Cited

U.S. PATENT DOCUMENTS

| | | | | |
|---|---|---|---|---|
| 6,151,608 A * | 11/2000 | Abrams | ............ | 707/204 |
| 6,182,136 B1 * | 1/2001 | Ramanathan et al. | ....... | 709/224 |
| 6,260,050 B1 * | 7/2001 | Yost et al. | ............ | 715/501.1 |
| 6,336,072 B1 * | 1/2002 | Takayama et al. | ......... | 701/200 |
| 6,336,138 B1 * | 1/2002 | Caswell et al. | ............ | 709/223 |
| 6,389,337 B1 | 5/2002 | Kolls | | |
| 6,496,814 B1 | 12/2002 | Busche | | |
| 6,502,131 B1 * | 12/2002 | Vaid et al. | ............ | 709/224 |
| 6,795,798 B2 * | 9/2004 | Eryurek et al. | ............ | 702/188 |
| 6,900,808 B2 * | 5/2005 | Lassiter et al. | ............ | 345/440 |
| 6,934,687 B1 * | 8/2005 | Papierniak et al. | ............ | 705/10 |
| 6,996,589 B1 * | 2/2006 | Jayaram et al. | ............ | 707/204 |
| 2002/0023261 A1 * | 2/2002 | Goodwin et al. | ............ | 717/146 |
| 2002/0049608 A1 * | 4/2002 | Hartsell et al. | ............ | 705/1 |
| 2002/0062237 A1 * | 5/2002 | Matsumoto et al. | ........... | 705/7 |
| 2003/0023685 A1 * | 1/2003 | Cousins et al. | ............ | 709/205 |
| 2003/0033191 A1 * | 2/2003 | Davies et al. | ............ | 705/10 |
| 2003/0110249 A1 * | 6/2003 | Buus et al. | ............ | 709/224 |
| 2003/0149682 A1 * | 8/2003 | Earley et al. | ............ | 707/1 |
| 2004/0015381 A1 * | 1/2004 | Johnson et al. | ............ | 705/8 |
| 2004/0103076 A1 * | 5/2004 | Casati et al. | ............ | 707/1 |

OTHER PUBLICATIONS

Sayal et al., "Business Process Cockpit," Proceedings of the 28th VLDB Conference, Hong Kong, China, 2002.*
Sayal et al., "Semantic Analysis of E-Business Operations," HP Laboratories, 2002.*
Fabio Casati and Ming-Chien Shan, "Event-Based Interaction Management for Composite E-Services in eFlow," (c) Kluwer Acadamic Publishers, 2002.*
Sahai et al., "Specifying and Monitoring Guarantees in Commeraical Grids through SLA," HP Laboratories, 2002.*

(Continued)

*Primary Examiner*—Tadeese Hailu

(57) ABSTRACT

A method and apparatus of monitoring business metrics, the method and apparatus providing an interface with which a user can specify what metrics to monitor, what type of visual element to use to display monitored information, and how to position the visual element on a screen.

10 Claims, 7 Drawing Sheets

OTHER PUBLICATIONS

Sahai et al., "Automated SLA Monitoring for Web Services," HP Laboratories, 2002.*

Sayal, et al., "Integrating Workflow Management Systems with Business-to-Business Interaction Standards," HP Laboratoreis, 2001.*

Halldor Fossa and Morris Sloman, "Implementing Interacitve Configuration Management for Distributed Systems," IEEE 1996.*

HP Labs: Tech Report: HPL-2002-176: Semantic Analysis of E-Business.*

Keim, Daniel, et a., "Pixel Bar Charts: A New Technique for Visualizing Large Multi-Attribute Data Sets without Aggregation", IEEE InfoVis 2001, California, 8 Pages (Oct. 2001).

Hao, Ming C., et al., "Market Backet Analysis Visualization on a Spherical Surface", Visual Data Exploration and Analysis Conference, San Jose, CA (Jan. 2001); Also Hewlett-Packard Labs Technical Reports HPL-2001-3, 9 pages (Dec. 2000).

Hao, Ming, et al., "Visual Data Mining for Business Intelligence Applications", WAIM 2000 Conference, China, pp. 1-17 (Apr. 2000).

Hao, Ming, et al., "Navigating Large Hierarchical Space Using Invisible Links", Visual Data Exploration and Analysis Conference, San Jose, CA (Jan. 2000). Also, Hewlett-Packard Laboratories Technical Report HPL-2000-8, 11 pages (Jan. 2000).

Hao, Ming, et al., "A Web-Based Visualization on Large Hierarchies Using Invisible Links in a Hyperbolic Space", IFIP TC2 WG2.6 Fifth Working Conference on Visual Database Systems, Japan (May 2000). Also, Hewlett-Packard Laboratories Technical Report HPL-2000-2, 12 pages (Jan. 2000).

Hao, Ming, et al., "A Java-Based Visual Mining Infrastructure and Applications", IEEE InfoVis99, California, (Oct. 1999). Also Hewlett-Packard Laboratories Technical Report HPL-1999-49, 10 Pages (Apr. 1999).

Hao, Ming, et al., "Visual Mining Large Web-Based Hyperbolic Space Using Hidden Links", Third International Conference on the Practical Application of Knowledge Discovery and Data Mining, UK (Apr. 1999). Also, Hewlett-Packard Laboratories Technical Report HPL-1999-20, 8 Pages (Feb. 1999).

* cited by examiner

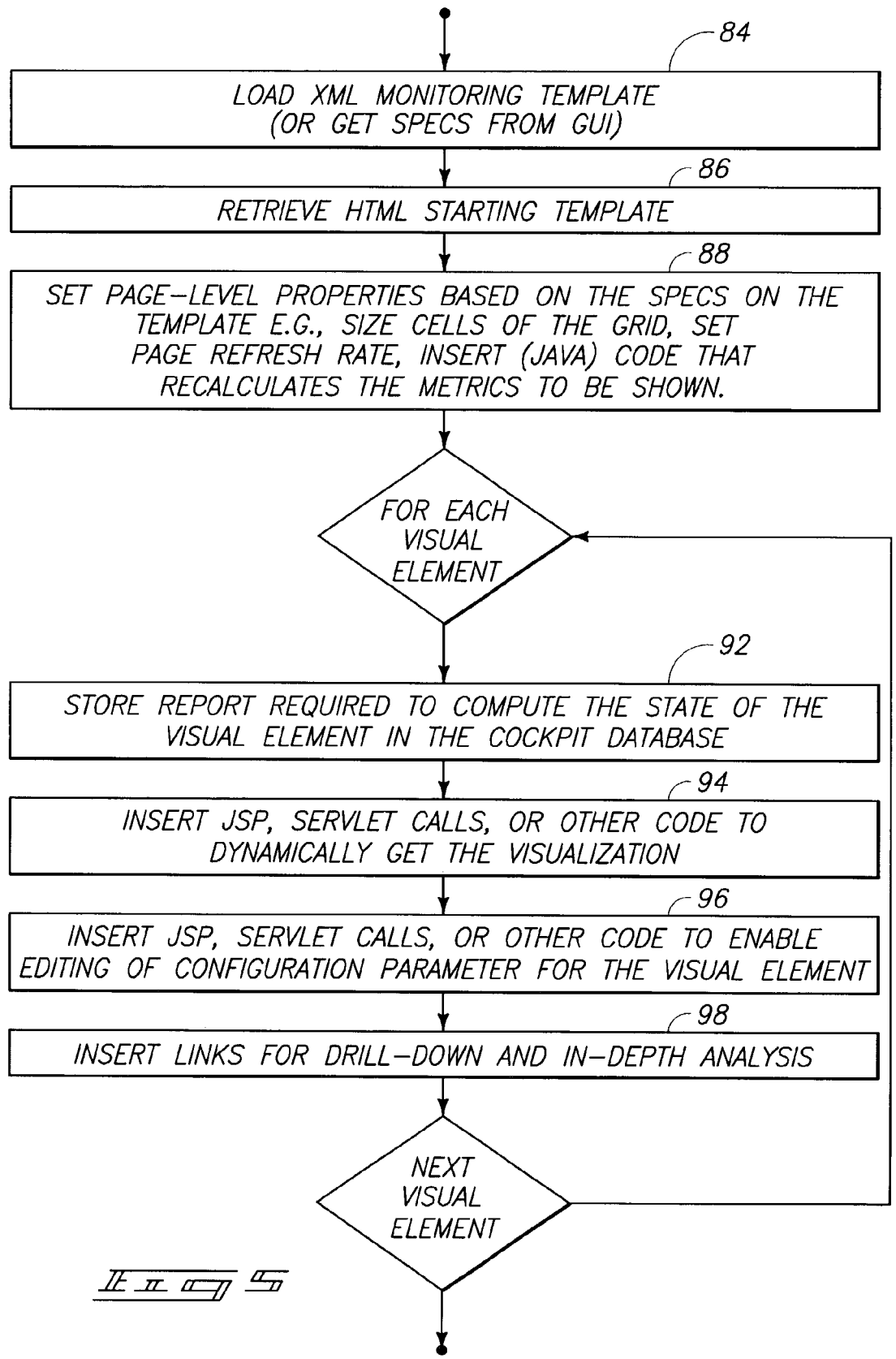

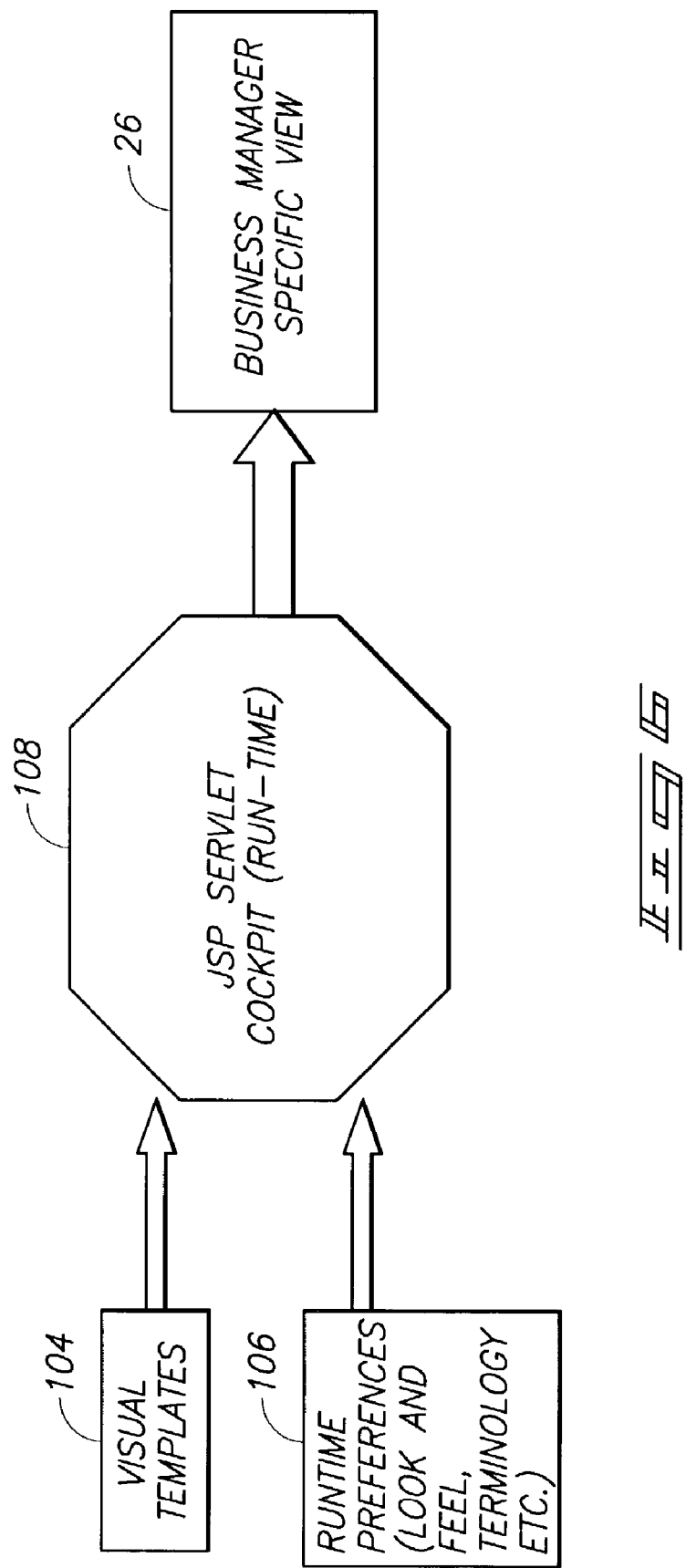

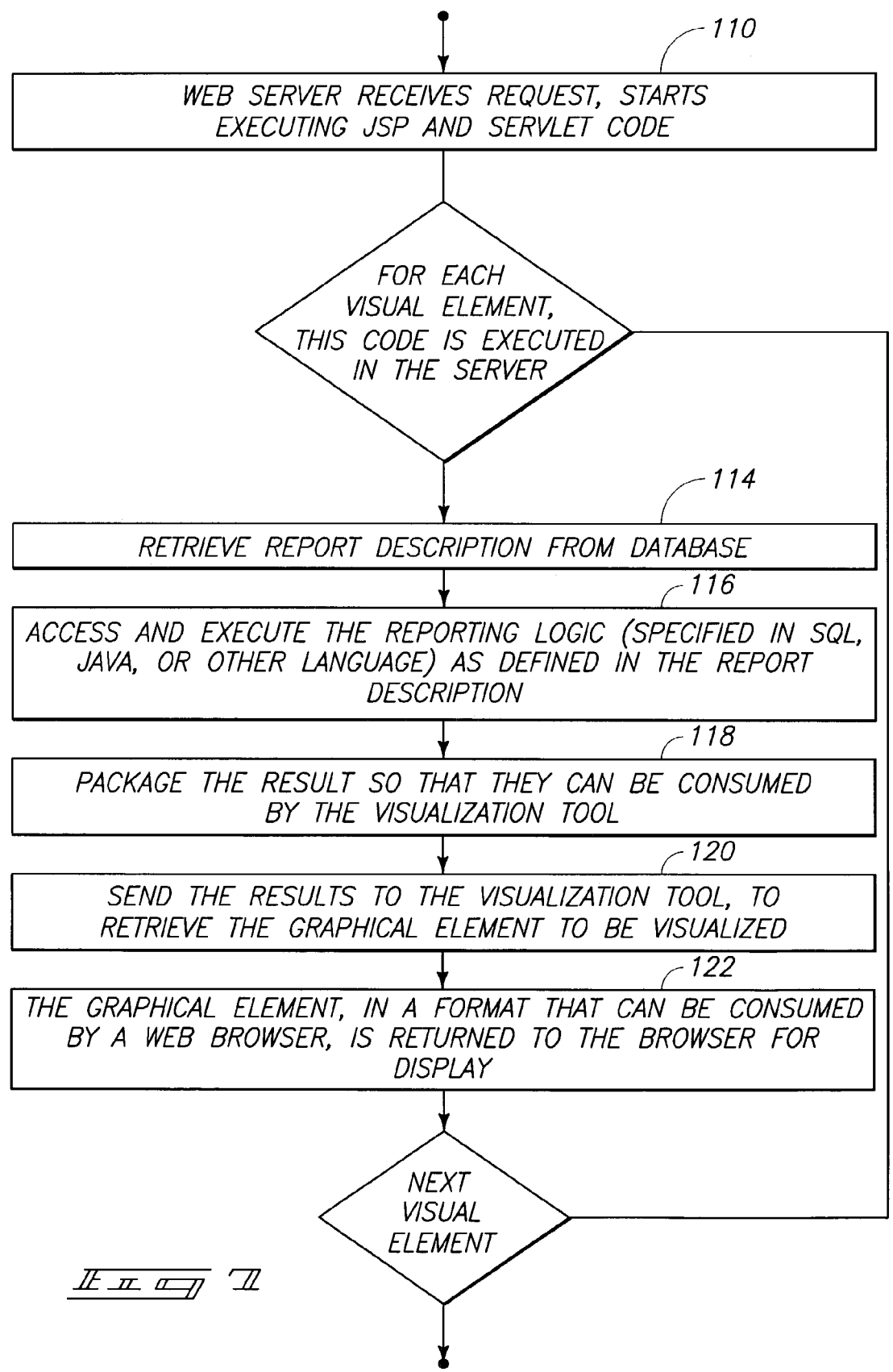

SYSTEM AND METHOD FOR MONITORING EVENT BASED SYSTEMS

FIELD OF THE INVENTION

The disclosure relates to systems and methods of monitoring event based systems. More particularly, the disclosure relates to systems and methods for monitoring business and information technology metrics and to graphical user interfaces.

BACKGROUND OF THE INVENTION

There are multiple systems and proposals for the monitoring of event-based systems. If a business process fails to work (e.g., processing of a purchase order is delayed or cancelled), a company can determine, using a monitoring system, if the delay or cancellation is due to a system being down or is due to a breakdown in the actual business process itself. Such a system also allows businesses to know which business processes will be affected if any given system or application fails. One proposal for the monitoring of event-based systems is provided, for example, the Open Management Interface (OMI) by webMethods, Inc., 3930 Pender Drive, Fairfax Va. 22030.

OMI is an open specification, which defines a standards-based (XML/SOAP/HTTP) management interface for an integration platform to manage business processes. Information about the Open Management Interface can be found at Open Management's web site, and is presently at http://www.webmethods.com/OMI_Spec_index/.

However, existing systems suffer from various drawbacks. For example, typical systems enable monitoring only of a predefined set of metrics. This is true, for example, of the Open Management Interface (OMI).

Existing systems provide a hard coded, limited set of visual elements, each of which is typically limited in configuration capabilities.

Existing systems often do not have an easy to use and flexible way of positioning and sizing visual elements. They also typically lack a flexible, easy to use, underlying mechanism for defining business level metrics.

It would therefore be desirable to provide a system and method that addresses one or more of the above issues.

DESCRIPTION OF THE DRAWINGS

FIG. 5 is a flowchart illustrating definition time application logic executed when a new monitoring template is specified in accordance with embodiments of the invention.

FIG. 6 illustrates run-time operation of the system in accordance with embodiments of the invention.

FIG. 7 is a flowchart illustrating logic that is followed when business users visit a monitoring web page, or as the page is refreshed in accordance with embodiments of the invention.

DETAILED DESCRIPTION OF THE INVENTION

This disclosure of the invention is submitted in furtherance to the constitutional purposes of the U.S. Patent Laws to promote the progress of science and the useful arts.

Attention is directed to U.S. Pat. No. 7,222,121, filed Nov. 21, 2002, titled "A Platform and Method for Monitoring and Analyzing Data" by inventors Fabio Casati; Ming-Chien Shan; Vijay Machiraju. This patent describes, among other things, business and information technology metrics that can be displayed in accordance with at least one embodiment of the system and method described below.

Figure 1:
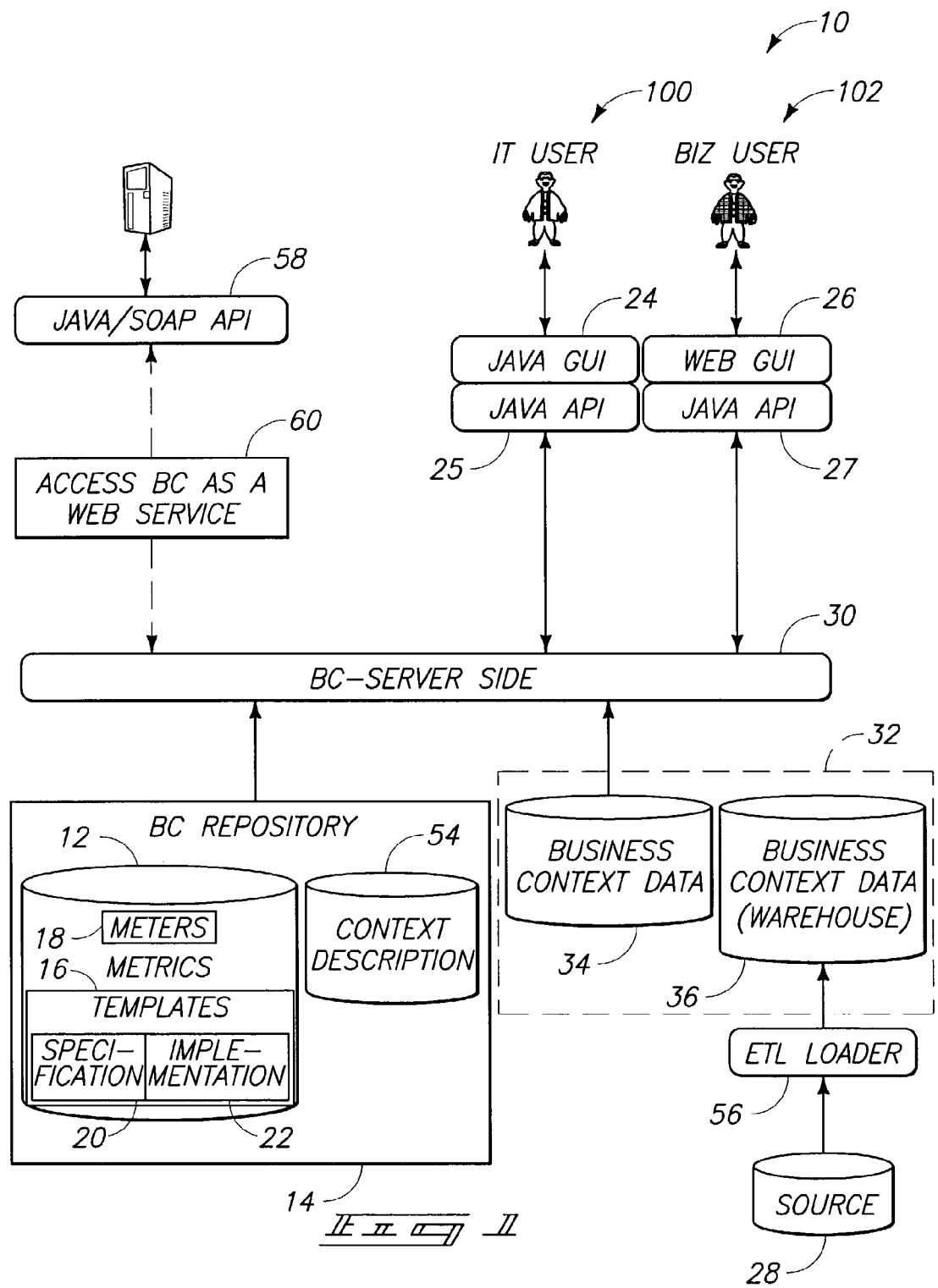
FIG. 1 is a block diagram illustrating the architecture of a system embodying various aspects of the invention.
Figure 2:
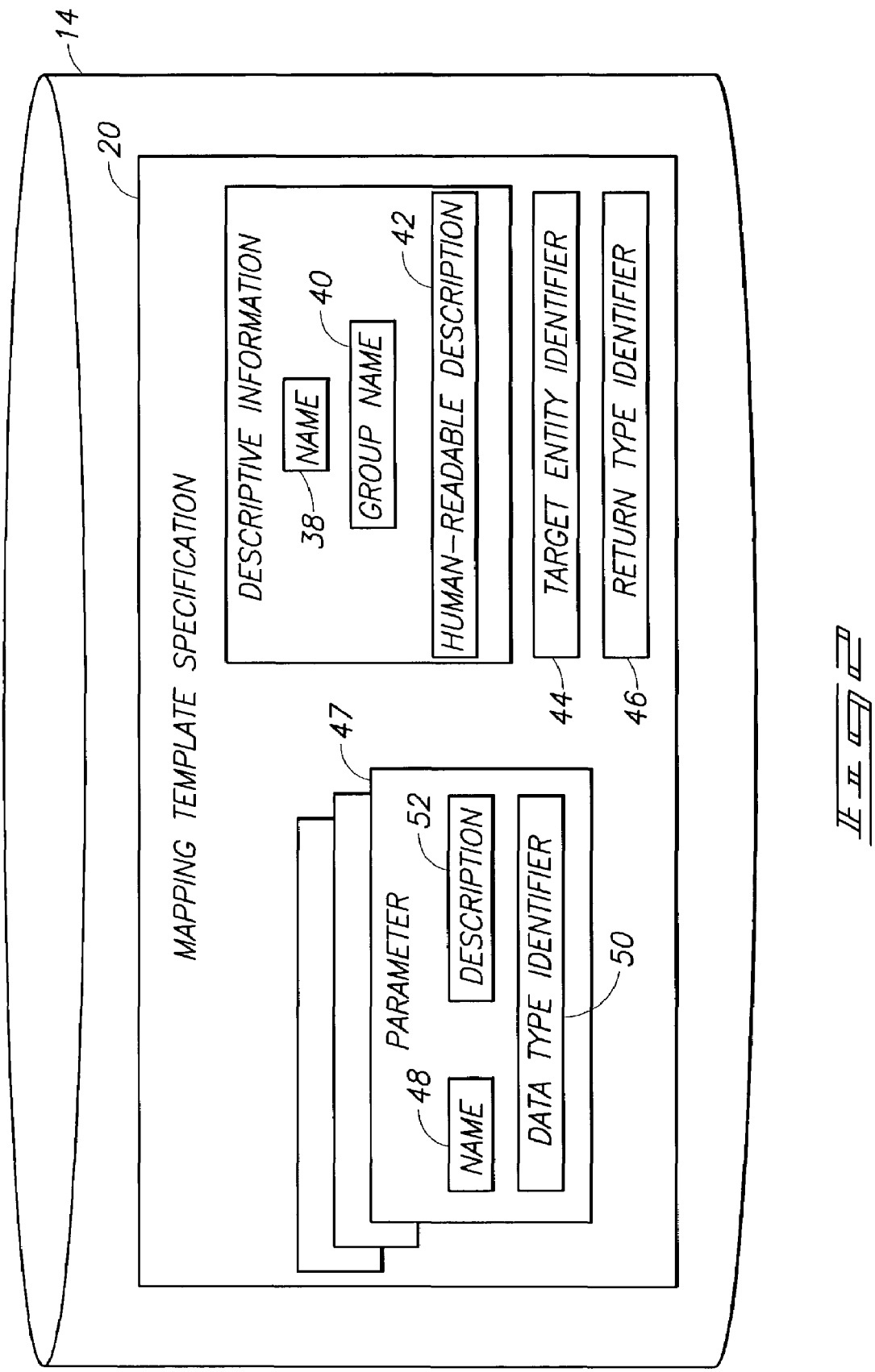
FIG. 2 is a block diagram illustrating a template in accordance with embodiments of the invention.

To put the invention into context, the concepts and architecture of the business cockpit (BC) system 10 will first be described, in connection with FIG. 1. The business cockpit system 10 includes a set of tools that enables business-level analysis of operational systems.

The business cockpit system 10 includes a platform that allows, in some embodiments, users 100 or 102 to define, compute, analyze, and monitor business and/or IT metrics on operational systems. With the business cockpit system 10, analysts can define the metrics they consider significant, and can then analyze such metrics, to assess, for example, the quality of their operations, identify problems, and devise solutions. In addition, they can monitor system operations in real-time, to assess whether their business is running and performing in a satisfactory manner and to locate bottlenecks.

Additionally, the business cockpit system 10, in some embodiments, has an "intelligent" layer that, based on innovative data mining techniques, can make accurate predictions on the future value of metrics of interest.

The term metric, as used in one embodiment, includes a name, unique within the system 10, and a data type, that can be, for example, Numeric, Boolean, or Taxonomy. For taxonomies, the definition may also include a description of the categories that are part of the taxonomy. The quality metric described above is an example of a taxonomical metric, while cost and profit are examples of numeric metrics. A metric can be thought of as identifying an aspect of a business that a user 100 or 102 wishes to monitor and analyze.

Metrics 12 (like every other business cockpit abstraction) can be defined in XML, for example, internally transformed into insertions into a relational database or repository 14.

A mapping template 16 is a parametric definition of a mapping from low-level data and metadata into a numeric or Boolean measure. Examples of functions computed by templates 16 are:
1. Was event E processed in time at least 90% of the time? (Boolean template)
2. Number of executions (numeric)
3. Percentage P of the value of an event data item D (numeric)
4. Did at least P % of the events take less than M minutes to complete? (Boolean).

Meters 18 selectively instantiate mapping templates 16 (i.e., reuse templates with specific values of the parameters) and apply them to data 32, to define how measures for a given metric are computed, depending on the data being measured. The data 32 includes, for example an employee record, or a financial transaction. Instead of monitoring the data, it is desired to monitor a metric defined over the data. For example, it may be desirable to monitor the cost or quality of an employee. Meters 18 will be described in greater detail below.

Mapping templates 16 may be defined by XML documents or via a GUI. Each template 16 includes a specification part 20 and an implementation part 22. The specification part 20 may provide a human readable description about the purpose of the template and about how to use it (i.e., the semantics of the template parameters). In one embodiment, the specification part 20 also provides information to be consumed by a (Java or web-based) graphical user interface (GUI). This is useful because new templates may be dynamically added to the repository 14. Because different templates 16 may have different characteristics (e.g., different number and type of parameters), the GUI 24 or 26 that assists users in selecting and instantiating templates is also dynamic, and is able to select the valid options that can be given to users in managing templates. The specification part 20 also provides information that the system 10 can use to optimize measure computation.

More particularly, the specification part 20 of a mapping template 16 includes, for example, a name 38, group name 40, description 42, and a set of attributes:

The target entity 44 specifies the kind of elements that are measured (e.g., event instances, actions, etc).

The return type 46 defines the data type of the value returned by the template. This can be either Numeric or Boolean.

For each template parameter, the definition includes the indication of the parameter name 48, data type 50, and a textual description 52 that can be used to convey the semantics of the parameter (for example, whether a numeric value is interpreted by the template as describing seconds, minutes, Dollars, Euros, etc). Data types include any SQL type.

The implementation part 22 contains the (parametric) code executed by the system 10 to compute the metric 12, or a reference to a file that contains the code. The implementation part 22 can be specified, for example, in SQL (Structured Query Language) or it can be a reference to a Java class that has a predefined structure (in one embodiment, implements a predefined Java interface). Other languages may be used. For example, if data sources 28 are not relational (e.g., an XML database), then a mapping may be implemented through an XQuery.

The implementation part 22 of the template 16 is represented by an SQL query or a Java class (implementing a BC-specified interface), that returns (Java) or selects (SQL) an object (tuple) compatible with the BC tables 14 where measures are stored. The tuple includes the measure plus attributes qualifying the measure, such as the identifier of the element being measured and the measurement time. In the condition part, the query should be able to capture, for all meters 18 using the template 16 to compute measures, both the template instantiation parameters and the set of elements that should be measured with this template, in order to compute measures appropriately.

The business cockpit system 10 has the knowledge required to automatically generate a large portion of the SQL. In one embodiment, wizards are provided to users 100 or 102, so that new templates can be defined writing no code at all, even when defining mappings.

The business cockpit system 10 includes a plurality of predefined, built-in, templates 16 that are applicable to compute measures on event-based data.

The meters 18 are the "instruments" used to compute metrics 12. In particular, meters 18 define which mapping 16 should be applied to compute a metric 12 within a given context 54. A context 54 is a set of elements that have common properties. For example, it can be data about financial transactions initiated by the same bank, it can be data about employees working at the same location, etc.

For example, in the event management context, a meter 18 may define which mapping should be used to compute the metric quality for the processing of overdraft events, while another meter may define a different mapping for computing the quality of new customer events.

Meters 18 are specified by instantiating templates 16. To do so, each meter 18 may specify which mapping template 16 it instantiates and which are the values to be given to instantiation parameters. For example, assume that a metric performance, with categories fast, acceptable, and slow has been defined, and that the analyst considers a certain set of events as being processed in a fast way if their execution time is below 10 seconds (in this example, "processing an event" means executing all the actions required to handle the event).

Then, the analyst can specify a meter 18 that is associated to category "fast", and that instantiates a template Duration Less Than, and set 10 as parameter (assuming that the template definition requires the parameter to be expressed in seconds).

A set of meters defined to compute a metric M is referred to as a measurement toolkit (or simply toolkit) of the metric M. Within a toolkit, each element must be associated to at most one meter, so that at most one value is computed. Elements for which no meter has been defined are not considered in the computation of the metric.

Data about metrics 12 (i.e., the definition of metrics, meters, and mappings) as well as data that give information on the business context 54 (i.e., which are the entities of the domain to be analyzed and what is their relationship, such as events and actions) are kept in the BC database 14.

The system 10 includes a server or server-side component 30 that processes definitions of metrics 12, meters 18, and mappings and stores them in the database 14. The component 30 also computes metrics on the business data 32. More particularly, the business data 32 includes context data 34. The context data 34 is "live" data as logged by the operational system 10. The business data 32 further includes a warehouse 36 of business context data. The warehouse 36 may include data that is pre-processed and collected into a data warehouse, and is generally a large repository of data.

The source 28 is source data; that is, the data logged by the system that it is desired to monitor and that will subsequently be loaded into the warehouse.

The ETL loader 56 extracts, transfers, and loads. It collects data from system logs and loads the data warehouse 36. The ETL loader 56 loads data on a periodic basis or at a user's request.

Interaction with the server-side object 30 can occur, for example, through a Java graphical user interface (GUI) 24 (especially thought out for Admin or information technology users 100) using a Java application application program interface 25, through a web graphical user interface (GUI) 26 (thought out for business users 102) using a Java application application program interface 27, and also through SOAP 58 (by accessing the server side component 30 as a web service 60).

Users (even IT users 100) may be provided with a system 10 that is simple to use, but that is also flexible. In particular, users are able to configure monitoring dashboards 58 through a point-and-click 60 (see FIG. 3).

To describe a dashboard, users can specify the following (e.g., using pull down menus or by right clicking):
1. What metric to monitor (e.g. number of critical events in the last hour);
2. How to display the monitoring information, e.g., which visual element to use
3. How to position the element on the screen
4. How often the information should be refreshed In one embodiment, users can select what to monitor in the same way they use the business cockpit system 10 for reporting. This is advantageous because they do not need to learn new concepts or to use a new user interface. It is also easier in terms of implementation, because it is possible to reuse the same screen. Basically, this boils down to defining which metric should be displayed.

Monitoring information may be shown in a variety of ways. In the illustrated embodiment, users may select among the following options:

Gauges 64. These are analogous to RPM counters in a car. The user may specify the minimum and maximum value, to instruct the system 10 about the scale. For example, minimum can be 10 and maximum can be 50. This means that measures <=10 would result in the gauge arrow pointing left, measures >=50 would result in an arrow pointing right, while for example a measure of 30 means that the arrow would be pointing up. Users can also configure the labels to be placed at the two ends of the gauge (eg, high and low, fast and slow, etc.).

Trends 66. These are charts in which a measure may be plotted against time. They may be much like Yahoo (™) stock charts. A new time point in the X axis 68 (and correspondingly a new line in the chart) may be drawn each time data are refreshed.

Traffic lights 70. The system, in some embodiments, displays a traffic light, with 2 or 3 lights. In this case the user also defines the ranges of the measure for the selected metric that correspond to red, green, and, if included, yellow as well.

Snapshots 72. In this case, a user may be shown exactly what would be shown for the reporting. A snapshot could be a bar chart, pie chart, a table, or any of the commonly used visual elements.

Each visual element may have a user-defined size and position.

In the illustrated embodiment, each visual element may be placed on an imaginary grid 74, and each visual element may occupy a user-defined number of contiguous cells 76 (e.g., from row 1 to row 2 and from column 4 to column 4, like the first of the traffic lights shown below.)

Having the notion of a grid 74 on the one hand allows the tool to be flexible, enabling the definition of custom positioning and sizes, while on the other hand providing a framework that makes it easy to organize information on the screen.

Besides positioning on the screen, information may be structured along several pages.

Figure 3:
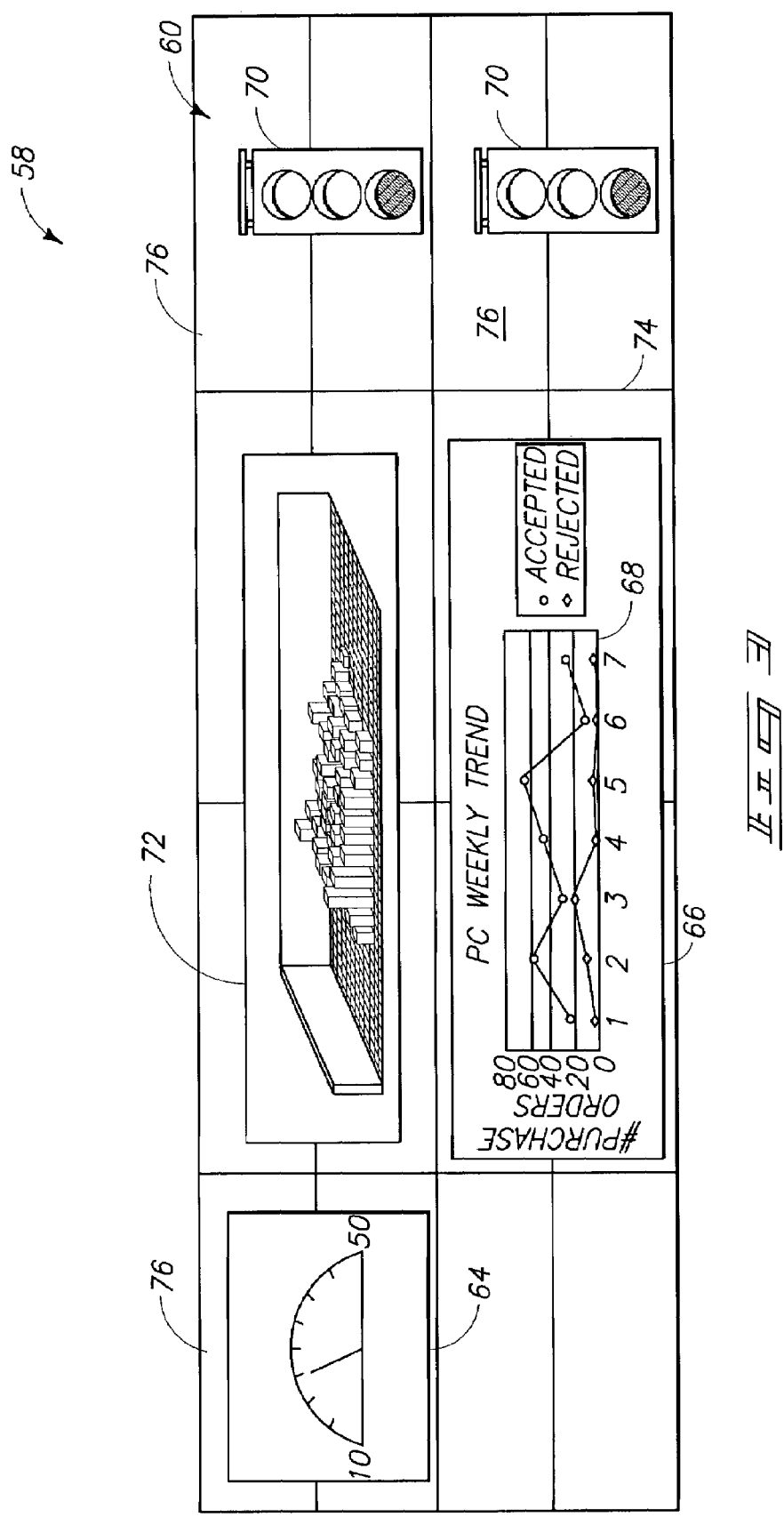
FIG. 3 illustrates various types of visual elements, and positioning of visual elements on a screen in accordance with embodiments of the invention.

Each page may contain a grid such as the one 74 shown in FIG. 3.

In one embodiment, for a web representation, the user has a clickable list of page titles on the left that will change a frame in the page—other manners of allowing flipping through pages are possible.

Users 100 or 102 may also specify how often the view should be refreshed. To make the specifications simple for the user, the specification may be set at the page level. It may be easier for the user, since it is similar to that of refreshing a web page. In another embodiment, refresh rate is set at the level of the single item, but it may be a confusing semantic. In the illustrated embodiment, refresh rate can be specified in minutes or seconds. In one embodiment, a default rate can be set; e.g., 10 minutes.

XML representation of monitoring or visual templates 104 (FIG. 6) is used as a facility for importing and exporting monitoring configuration to/from a flat file. An example according to some embodiments is provided below:

```
<PAGE>
    <TITLE>Critical events</TITLE>
    <DESCRIPTION>This screen contains several visual elements that
    enable the monitoring of critical events and of how quickly and
    efficiently they are being processed</DESCRIPTION>
    <GRID>
        <CELL TOP-X="1" TOP-Y="1" WIDTH="2" HEIGHT="1">
            <REPORT>
                <METRIC>
                    <CATEGORY>Occurrences</CATEGORY>
                    <NAME>critical events<NAME>
                </METRIC>
                <AGGREGATION>Count</AGGREGATION>
                <DOMAIN type="entity">
                    EVENT
                </DOMAIN>
                <FILTERS>
    meaning: restrict to "overdraft" events occurred in the
    last 30 minutes
                    <FILTER type="entity">
                        <ENTITY>EVENT</ENTITY>
                        <ELEMENT>OVERDRAFT</ELEMENT>
                    </FILTER>
                    <FILTER type="time">
                        <DAYS>0</DAYS>
                        <HOURS>0</HOURS>
                        <MINUTES>30</MINUTES>
                    </FILTER>
                </FILTERS>
            </REPORT>
            <MONITOR>
                <VISUALIZATION TYPE="GAUGE">
                    <MIN> 0 </MIN>
                    <MAX> 50 </MAX>
                <VISUALIZATION>
            </MONITOR>
        </CELL>
    </GRID>
    <REFRESH_RATE>
        <HOURS>0</HOURS>
        <MINUTES>10</MINUTES>
    </REFRESH_RATE>
</PAGE>
```

Figure 4:
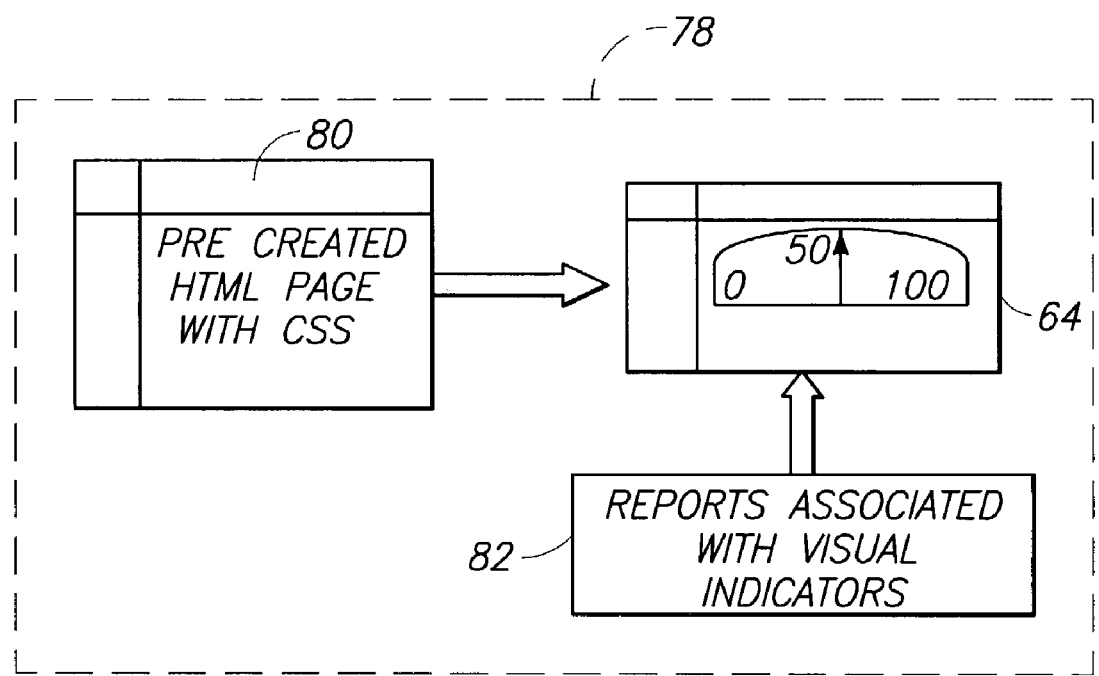
FIG. 4 illustrates operation of a definition time composer in accordance with embodiments of the invention.

During definition time (FIGS. 4-5) in some embodiments, developers are presented a list of supported visuals indicators. They may then associate a visual indicator suitable for a given report. Developers may also specify which attributes can be customized by the end-user (BUsiness Manager, or BUM).

During definition time in some embodiments, a BC composer 78 defines a page or set of pages for the end user. The composer takes, for example, a pre-created HTML page template 80 (that includes color schemas, fonts, CSS—cascading style sheets etc.), and uses a table/grid mechanism 74 to position one or more visual indicators 64, 66, 70, 72 on one or more pages, according to the reporting template specifications. The composer 78 also associates hyper links with the visual indicators (image map), to enable custom navigation and drill-down, such as to reports 82.

FIG. 5 is a flowchart illustrating definition time application logic executed, according to some embodiments, when a new monitoring template is specified.

In step 84, a monitoring (visual) template 104 may be loaded, or specifications may be received from a graphical user interface 24 or 26. The monitoring template may define which are the metrics of interest, which is the visual element that should be used to display each of them, how they should be positioned on the screen, and the data refresh rate.

In step 86, an HTML starting template may be retrieved. This template may define the overall look and feel of the Web page.

In step 88, page level properties may be set based on the specifications of the template (e.g., size cells of the grid 74, page refresh rate), and code may be inserted that calculates the metrics to be shown.

For each visual element 64, 66, 70, and 72, steps 92-98 are performed.

In step 92, a report (that is, a description that identifies a metric of interest to be displayed and other characteristics about the information to be displayed, such as a user-friendly name of the report and titles for X and Y axis of the chart) is stored in the database 14.

In step 94, code is inserted to dynamically produce the visualization. In one embodiment, this step retrieves the metric on which the visual element is based, and it generates JSP code that calls a Java object. This object in turn can retrieve the data for that metric as well as retrieve the visual element (e.g., a bar chart or a gauge) to be displayed on the page.

In step 96, code is inserted to enable editing of configuration parameter for the visual element. This step may be needed if users want to change the configuration of the visual element, for example to change the title or the color of the bar chart or of the gauge.

In step 98, links may be inserted for drill down and in-depth analysis, meaning that the JSP code previously generated may be modified in case the resulting visual element is "clickable", i.e., actions may be performed when parts of the visual element (e.g., a bar of a bar chart) are clicked.

At run-time (see FIG. 6), the cockpit system 10 (running code 108 such as a JSP or a servlet) renders the information to the end user 100 or 102, in some embodiments, by using the visual templates 104 defined above and user preferences 106.

FIG. 7 is a flowchart illustrating logic that, in some embodiments, may be followed when business users visit a monitoring web page, or as the page is refreshed.

In step 110, the web server 30 may receive a request and start executing code 108. In particular, this may mean that all the Java code embedded in the JSP page is executed, thereby returning the visual elements. One object invocation may be executed for each visual element to be displayed.

Steps 114-122 may be repeated for each visual element.

In step 114, the Java object invoked by the JSP page may retrieve a report description (i.e., a description of what metric is to be displayed) from the database 14.

In step 116, the report associated to the visual element may be accessed and the corresponding metric computed.

In step 118, the results, in some embodiments, are packaged so that they can be consumed by the visualization tool 108. In fact, the computed metric data may be organized and packaged based on the kind of visualization needed. For each kind of visual element, a different Java object may be invoked, to get the image. For example, to get a bar chart, the tool invokes a Java object that receives data and generates an image displaying a bar chart, based on the data.

In step 120, the results may be sent to the visualization tool 108, to retrieve the graphical element 64, 66, 70, 72 to be visualized.

In step 122, the graphical element 64, 66, 70, 72 may be returned to the browser 24 or 26 for display, in a format that may be consumed by the browser 24 or 26.

The structure of the system 10 and the notions of metric, meter, and mapping enable the monitoring of business-level metrics that may be easily and quickly defined by users.

The visualization paradigm, in some embodiments, based on grids 74 with fixed-width cells but with variable-width visual elements 64, 66, 70, 72 (that can span multiple cells 76) may be both easy to use for designers and easy to implement for the system.

The system 10 links business metrics with a number of different visual elements 64, 66, 70, 72 that may be configurable in a very flexible way.

Metric computation performance (a key issue in real-time monitoring) may be especially fast, since it typically depends on the number of mappings needed to compute the metrics, which is typically much smaller than the number of metrics itself.

The architecture enables the usage of mappings specified in different languages and of different kinds of visualization packages. In one embodiment, computer readable media bearing program code embodies the logic described above and shown in the various figures.

While embodiments of the invention have been described above, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of monitoring at least one of business and information technology metrics, the method comprising:

providing an interface with which a user can specify what metrics to monitor, what type of visual element to use to display monitored information, and how to position the visual element on a screen; and providing a mapping template that can be reused with different values of parameters, the mapping template being configured to convert data to a form useable by a visual element; and creating a monitoring template for use in monitoring the at least one of business metrics and information technology metrics, wherein creating a monitoring template comprises:

retrieving a predefined HTML page template, the template including specifications relating to size of cells defining a grid for use in specifying positions of visual elements and refresh rate;

setting page level properties, including size of cells and refresh rate;

inserting code to calculate metrics to be shown using the visual elements; and for each visual element:

sorting a report to compute the state of the visual element;

inserting code to dynamically produce the visual element;

inserting code to enable editing of a configuration parameter for the visual element; and inserting links for drill down.

2. A method of monitoring at least one of business and information technology metrics, the method comprising:

providing an interface with which a user can specify what metrics to monitor, what type of visual element to use to display monitored information, and how to position the visual element on a screen; and providing a mapping template that can be reused with different values of parameters, the mapping template being configured to convert data to a form useable by a visual element; and rendering information to an end user using a monitoring template, the monitoring template being for use in monitoring the at least one of business metrics and information technology metrics, wherein rendering information comprises:

for each visual element:
- retrieving a description of a report to be displayed using a visual element;
- accessing and executing reporting logic based on the report description;
- packaging the result of the execution of the reporting logic for consumption by a visual element;
- retrieving a visual element; and
- displaying the retrieved visual element.

3. A method in accordance with claim 2 and comprising applying the mapping template to business data.

4. A method in accordance with claim 2 and further comprising defining the mapping template using XML.

5. A method in accordance with claim 2 wherein the mapping template is configured to convert raw data into boolean data.

6. A method in accordance with claim 2 wherein the mapping template is configured to convert raw data into numeric data.

7. A method in accordance with claim 2 wherein the mapping template includes a human readable description about the purpose of the template and about how to use it.

8. A method in accordance with claim 2 wherein the mapping template provides information for use by a graphical user interface.

9. A method in accordance with claim 2 wherein the mapping template includes a target entity attribute that specifies the kind of element that is measured, whether event instances or actions.

10. A method in accordance with claim 2 wherein the mapping template includes a return type attribute that specifies data type returned by the template, whether numeric or boolean.

* * * * *

UNITED STATES PATENT AND TRADEMARK OFFICE
CERTIFICATE OF CORRECTION

PATENT NO.        : 7,437,675 B2
APPLICATION NO.   : 10/358042
DATED             : October 14, 2008
INVENTOR(S)       : Fabio Casati et al.

Page 1 of 1

It is certified that error appears in the above-identified patent and that said Letters Patent is hereby corrected as shown below:

In column 4, line 59, after "point-and-click" insert -- interface --.

In column 6, line 31, delete "<VISUALIZATION>" and insert -- </VISUALIZATION> --, therefor.

Signed and Sealed this

Seventeenth Day of March, 2009

JOHN DOLL
*Acting Director of the United States Patent and Trademark Office*